US008140954B2

(12) United States Patent (10) Patent No.: US 8,140,954 B2
Carro (45) Date of Patent: Mar. 20, 2012

(54) SYSTEM AND METHOD FOR PROVIDING ON DEMAND CAPTIONING OF BROADCAST PROGRAMS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1446 days.

(21) Appl. No.: 11/345,255

(22) Filed: Jan. 31, 2006

(65) Prior Publication Data

US 2006/0274214 A1 Dec. 7, 2006

(30) Foreign Application Priority Data

Jun. 29, 2005 (EP) ..................................... 05300531

(51) Int. Cl.
*G06F 17/00* (2006.01)
(52) U.S. Cl. .......................... 715/203; 715/753; 348/722
(58) Field of Classification Search .................. 715/203, 715/273, 783, 851, 855; 725/51, 109–112
See application file for complete search history.

(56) References Cited

U.S. PATENT DOCUMENTS

| 5,508,754 | A  | * | 4/1996  | Orphan ........................ 348/722 |
| 2004/0133919 | A1 |   | 7/2004  | Incentis |
| 2004/0139469 | A1 |   | 7/2004  | Incentis |
| 2004/0139474 | A1 |   | 7/2004  | Carro |
| 2005/0226601 | A1 | * | 10/2005 | Cohen et al. ..................... 386/75 |
| 2005/0251832 | A1 | * | 11/2005 | Chiueh ........................... 725/62 |
| 2008/0010342 | A1 | * | 1/2008  | Gebhardt et al. ............. 709/204 |

FOREIGN PATENT DOCUMENTS

| WO | WO 02/091228 | 11/2002 | |
| WO | WO 02/091739 | 11/2002 | |
| WO | WO 02/091744 | 11/2002 | |
| WO | WO 02091228 A2 * | 11/2002 | ................... 715/203 |
| WO | 2004093450 A1 | 10/2004 | |
| WO | WO 2004/093450 A1 | 10/2004 | |

OTHER PUBLICATIONS

ATSC: "ATSC Mobile/Handheld Digital Television Standard," Doc. A/153, Advanced Television Systems Committee, Washington, D.C., Oct. 15, 2009; Part I, pp. 13-18; Part III, pp. 74-82.

* cited by examiner

*Primary Examiner* — Cesar Paula
*Assistant Examiner* — Quoc A Tran
(74) *Attorney, Agent, or Firm* — George R. McGuire; Blaine T. Bettinger; Bond Schoeneck & King

(57) ABSTRACT

The present invention relates to a system, method and computer program for enabling a user receiving a broadcast program on a program receiver to download on his/her computer device time stamped captions and synchronization data related to the received broadcast program, and to autonomously generate and display on his/her computer device, a captions stream synchronized with the display of the broadcast program on the program receiver.

18 Claims, 12 Drawing Sheets

SYSTEM AND METHOD FOR PROVIDING ON DEMAND CAPTIONING OF BROADCAST PROGRAMS

CROSS REFERENCE TO RELATED APPLICATION

The present application claims priority to European Patent Application No. EP05300531, filed Jun. 29, 2005.

FIELD OF THE INVENTION

The present invention relates to on demand captioning of broadcast programs and more particularly, to a system, method and computer program for synchronizing a downloaded time stamped captioning stream to a remotely broadcast media stream.

BACKGROUND OF THE INVENTION

Captioning is defined as the rendering of speech and other audible information (112) into written language (111) or transcription of the audio. Audio captions (111) may be written transcriptions or written translations of the audio portion (112) of television programs (113) and other video materials, such as training tapes, corporate communications, etc.

Closed captioning was developed in the 1970's to allow deaf and hard of hearing viewers to understand television programming. Since that time, many other uses of captioning have been discovered, including its use to teach foreign languages. Individuals can use captioning to comprehend audio or video media. Individuals with normal hearing may also use captioning to comprehend a television program in public areas with high noise levels, or to comprehend a television program recorded on a different language.

Anything that is produced on video or broadcast can be captioned. A content provider (i.e. television network) may use online captioning or offline captioning to generate a captioning text stream. Offline captioning is performed "after the fact" in a studio. Examples of offline captioning include television game shows, videotapes of movies, and corporate videotapes (e.g., training videos). The text of the captions is created on a computer, and the captions stream (701) is synchronized to the video (702) using time codes. The captions are then transferred to the videotape before it is broadcast or distributed. On broadcast television closed captions are encoded, or imbedded, into Line 21 of the broadcast signal, so that they are visible only when decoded by caption-capable television sets.

A limitation of today's captioning systems is that, since captions are encoded and transmitted on the media stream (e.g., on Line 21 of a broadcast video stream), and are decoded and displayed by the media player or broadcast receiver (e.g., a TV set), there is not way to provide on demand, selectable, personalized, captioning services that could be individually requested by people attending a program played on a media player or broadcast receiver (e.g., a TV set on a public place, like a cafeteria or a bus station).

In fact, not every people attending the same program have a need, or the same need, of receiving captioning services. For example, text captions of a TV program played on a public place (e.g., a cafeteria) may be a need for a deaf person, but not for the other people attending the TV program. Textual captions displayed on a TV set, may be needed by a particular person, but may disturb the visual comfort of other people attending the same program on the same TV set. Also, when a TV program is being received on a public place (e.g., on a TV set on a pub in London), displaying textual captions on a selected language (e.g., French) may be needed by a foreigner (e.g., by a French national), but not by most people (e.g., Britons) attending the program on the pub. Thus, displaying captions on a TV set may be needed by some people, but may disturb other.

The popularity of wireless portable computers such as handheld devices (100) or cell phones for connecting to the Internet (108) is increasing as users interest becomes pervasive and as users are more often working in mobile environments. At the same time, the popularity of making network connections using connection services that charge fees based upon the duration of connections (such as cellular services, which are commonly used for wireless connections from portable computers) is also growing. When using this type of relatively expensive connection, the longer the user is connected, the higher the connection charges will be. This prevents, by instance, a user to remain wirelessly connected to a simulcast web service to receive on-line captions while attending a broadcast movie. Wireless connections also tend to have high network latencies, due to the limited bandwidth available and the extra network hops (e.g. gateways) that are involved with intermediate wired and wireless nodes. As a result, a user may suffer long delays preventing webcast captions to be received and played on synchronism with a (simulcast) broadcast program. Finally, a major drawback is that long wireless connections drains lots of battery charge.

Therefore, there is a need to provide on demand personalized, captioning services to people receiving broadcast programs on mobile environments.

OBJECTS OF THE INVENTION

It is an object of the invention to synchronize a downloaded time stamped captioning stream to a remotely broadcast media stream.

It is also an object of the invention to provide on demand, captioning services requested by people attending broadcast programs on a mobile environment.

Other objects of the present invention will in part be obvious, and in part appear hereinafter.

SUMMARY OF THE INVENTION

The aforementioned challenges are resolved by providing a user (301) of a computer device (300), the capability of:
  connecting to a communication network (308);
  downloading from a server (305), a captions file (309) and synchronization data (310) corresponding to a broadcast program (313) that is being received in real-time; and
  by disconnecting the user device (600) from the network (608), autonomously generating and displaying on the user device a captioning stream (611) synchronized with the reception of the broadcast media stream (615).

For that purpose, the user device (100) uses universal-time synchronization signals (110), such as those provided by a GPS receiver (102), to synchronize the captioning stream (111) played on the user device (100), with the broadcast media stream (113) played on a media-playing device (103). This broadcast media stream (113) is transmitted by a broadcast station (104) and is also kept in synchronism with the universal-time synchronization signals (109) provided by a GPS receiver (106).

Accordingly, the invention discloses a system, method and computer program for use on a user device (100), for enabling a user (101) receiving a broadcast program (113) on a media-playing device (103):

to download from a server (305) a time stamped captions file (309, 400) and synchronization data (310, 410) related with the received broadcast program, when the user device (300) is connected to a communications network (308);

to autonomously play a captions stream (611) on the user device (600), synchronized (609, 610) with the display of the broadcast program stream (615) on the media-playing device (603), when the user device (600) is disconnected from the communications network (608).

The captions text (611) is displayed on the user device (600) while the broadcast stream (615) plays. The user device comprises means to adjust (shift) the timing of the captioning stream (611) in order to fine-tune the synchronization between the captioning stream (611) and the broadcast program stream (615). By means of such a system, a user can select, receive and display captions (611) of broadcast programs (615), from his/her user device.

More particularly, the present invention is directed to a method for autonomously displaying on a computer device, a time stamped captioning stream synchronized with a broadcast program received and displayed on program receiver, said method comprising the steps of:

retrieving on a captioning server time stamped captions and synchronization data associated with a broadcast program;

autonomously and automatically generating on the computer device from the received time stamped captions file and synchronization data, a time stamped captioning stream synchronized with the broadcast of the program;

autonomously displaying on the computer device said time stamped captioning stream in synchronism with the reception and the display of the broadcast program on the program receiver.

Furthermore, the present invention is directed to a method for use in a server of providing on demand captioning services requested by one or a plurality of users watching a broadcast program on a program receiver, said method comprising the steps of:

associating with a broadcast program time stamped captions and synchronization data;

storing said time stamped captions and synchronization data so that said time stamped captions and synchronization are accessible by one or a plurality of computer devices;

receiving from one or a plurality of computer devices a request for captions identifying a broadcast program;

sending to said computer device in response to each request, the time stamped captions and the synchronization data associated with the identified broadcast program, so that said computer device can autonomously and automatically generate a time stamped captioning stream synchronized with the broadcast of the program.

Further embodiments of the invention are provided in the appended dependent claims.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF PREFERRED EMBODIMENT OF THE INVENTION

Basic Principles

Figure 1:
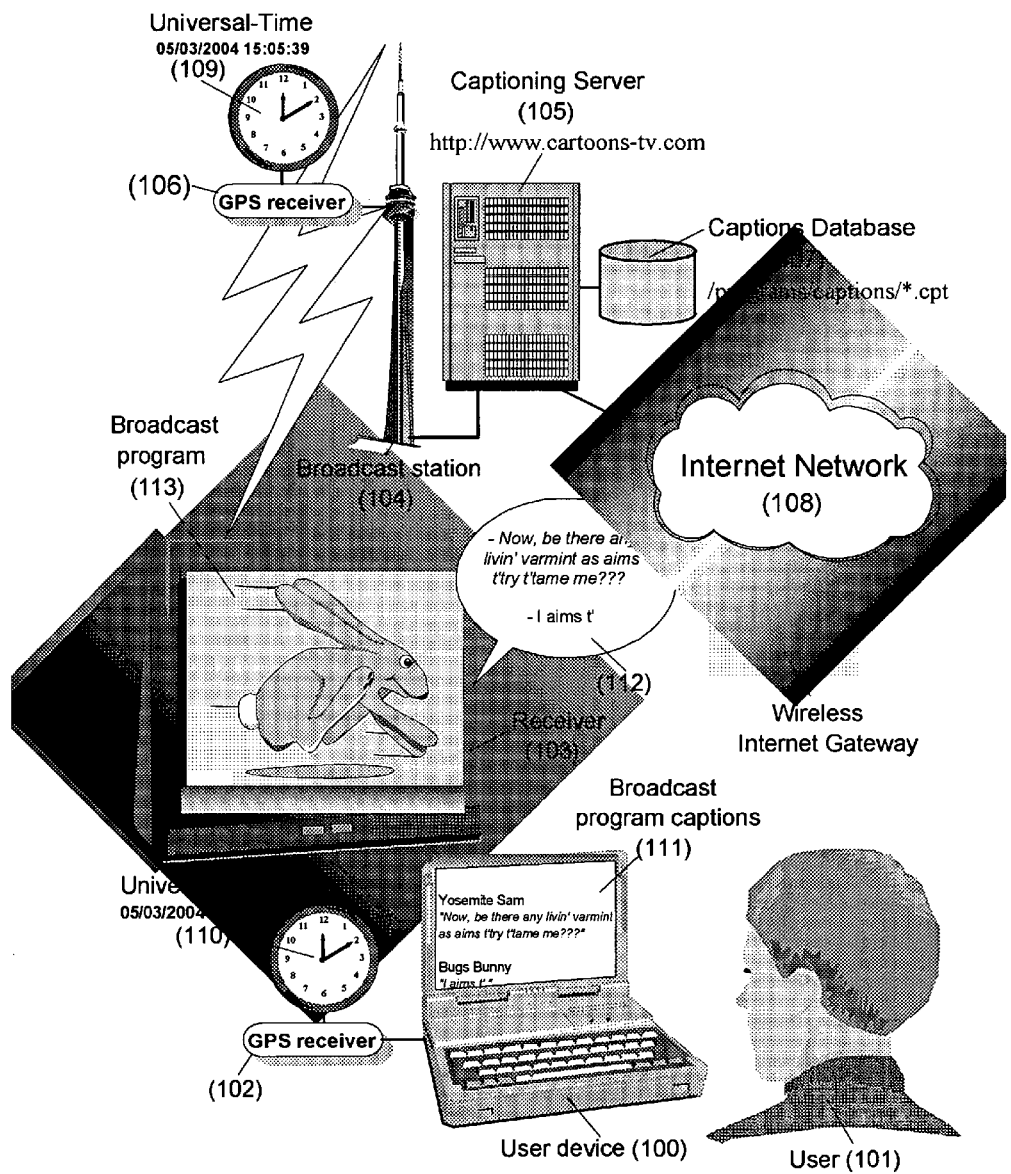
FIG. 1 shows the system according to the present invention for downloading captions of a broadcast program to a user device, and for playing said captions synchronized with the reception of the corresponding frames of said broadcast program.

As illustrated in FIG. 1, the present invention is directed to a system, a method and a computer program for enabling a radio auditor or a television viewer (101) attending a broadcast program (113) (i.e., a radio broadcast or a television program received in real-time), to play on a stand-alone (i.e., not connected to a network) user device (100), a captioning stream (111) synchronized with the received broadcast program stream (113). FIG. 1 also shows the main components of the system according to the present invention for downloading captions of a broadcast program (113) to a user device (100), and for playing said captions (111) on said user device, in synchronism with the reception of said broadcast program.

For this purpose, the present invention allows a user (301):

by connecting a user device (300) to a network (308):

to identify the network address (314) of captioning services provided by the station (304) broadcasting the program (313) that is being received;

to use said identified network address to have access (315) from the user device to a captioning server (305) connected to said broadcast station (304);

to retrieve from the accessed captioning server (305), and to store on the user device (300), a time stamped Captions File (309, 400), and synchronization data (310, 410) corresponding to the program (313) transmitted by the broadcast station (304);

to generate from the received time stamped Captions File (400) and synchronization data (410), a time stamped captioning stream (500) on the user device (300); and by disconnecting the user device (300, 600) from the network (608):

to play and display to the user (601) on the user device (600) said captioning stream (500, 611) in synchronism with the reception of the broadcast program (615).

A typical scenario according to the present invention would be the following: a user (101) attends a broadcast event on a public place comprising a media-playing device (103) displaying a movie (113). For example, a user (101) wishes see captions of a movie (113) that is being displayed on a TV set (103) in a cafeteria.

By identifying the station (304) broadcasting the program (313), the user (301) instructs his user device (300) to download from a Captioning Server (305) connected to the broadcast station (304), a Captions File (309, 400) (i.e., a file of time stamped captions related to the program), and synchronization data (310, 410). The synchronization data includes a reference to the universal-time (312, 412) and to the program's time elapsed from the start of the program (311, 411) (i.e., the accumulation of the duration's of already transmitted sequences of the program transmitted by the broadcast station (304)) at said universal-time (312, 412).

Connected and Disconnected Mode

The user device (300) must be first connected to a communications network (308) to download from the Captioning Server (305), the Captions File (309, 400) and synchronization data (310, 410) of the broadcast program. Once downloaded, captions (611) are extracted from said Captions File (310, 410) and are autonomously played by the user device (600). Captions are synchronized with the broadcast program (615) that is being received in real time even if the user device is disconnected from the network (608).

Having the possibility to disconnect the user device (600) from the network while captions (611) are being played is advantageous, since:

Long wireless connections are expensive. Fees based upon the duration of connections (such as cellular services, which are commonly used for wireless connections from cell phones and portable computers) prevents, for instance, a user to remain wirelessly connected to a simulcast web service to receive on-line captions while attending a broadcast movie.

Wireless connections tend to have high network latencies, due to the limited bandwidth available and the extra network hops (e.g. gateways) due to the use of intermediate wired and wireless nodes. As a result, a user may suffer long delays preventing webcast captions to be received and played on synchronism with a (simulcast) broadcast program.

Also, a major drawback is that long wireless connections drains lots of battery charge.

Those drawbacks are easily overcome by the present invention, since the invention only requires a short connection between the user device (301) and the network (308), merely for downloading the Captions File (309, 400) and the synchronization data (310, 410) from the Captioning Server (305). After the disconnection of the user device (600) from the network (608), the user can automatically start the playing of the captions (611) in synchronism with the received broadcast program (615).

Captions File

According to the present invention, the Captions File (309, 400) of a broadcast program can be downloaded at any moment, prior to the broadcasting, or during the reception of the program. Once the program starts, the synchronization data (310, 410) can be downloaded by the user at any moment (e.g., immediately after the program starts to be displayed on the TV receiver, or once restarted after a publicity interruption).

The user device may download the Captions File (309, 400) and synchronization data (310, 410) using various methods. For example, the user may download the Captions File and synchronization data corresponding to a movie (313) being played on a TV set (303) using a wireless connection.

In a particular embodiment of the invention, the Captions File (309, 400) can be downloaded in advance before the transmission of the program, from the Captioning Server (305) or from a Web site of the broadcaster, by connecting the user device (300) to the Internet through a wired connection.

In another embodiment, the Captions File (309, 400) can include graphic information to support textual captions.

Captions Table

The synchronization of:

the broadcast programs streams (113) transmitted by the broadcast stations (104) and played on the broadcast receivers (103), with the corresponding captioning streams (111) displayed on the user devices (100), is done referring to an universal time such as the Global Positioning System Time (GPS-time), the Global Orbiting Navigational Satellite System (GLONASS) time or another suitable universal time based on a satellite system. A GPS or GLONASS receiver (106) is connected or integrated to the broadcast station (104). At the user side, a GPS or GLONASS receiver (102) can be integrated or connected to the user device (100). User devices can be independent from radio or television sets (103) on which broadcast programs (113) are played.

When the captions (413) of a program (414) are edited by the editor or producer of the program, these captions are time tagged with reference to the time elapsed (e.g., seconds) (416) from the start of the program (415). After downloading the Captions File (309, 400) to the user device (300), the user device and the broadcast station are synchronized according to the same universal-time (302, 306): the universal-time (312, 512) corresponding to the start of the broadcast program, and the universal-time (513) corresponding to the display of any caption (514) comprised in the Captions File (400). Basically, the user device (600) retrieves from the received synchronization data (510), the universal-time (512) and the time elapsed (511) from the start of the program at said universal-time. Using both values (511, 512) as a reference, a Captions Table (500) is computed by the user device (600). This Captions Table (500) comprises the universal-times (513) corresponding to the time stamped captions (514)

that must be displayed in synchronism with the reception of the broadcast media stream (615).

The user device (600) uses the universal-time (610) (such as GPS time) provided by a universal-time clock (602), to synchronize the captioning stream (611) with the broadcast program stream (615). Using the example described above, the user device uses the signal (610) received from the GPS to synchronize according to the same universal-time (609), the caption script (611) played on the user device (600) with the movie displayed on the TV set (603) and transmitted by the broadcast station (604).

The user device (300) may request one or more resynchronization signals (803, 804) throughout the duration of the media stream (801). For example, even if the user enters the cafeteria after the movie (801) has started, he can download (805) the Captions File (400) and synchronization data (410) on his user device, and start playing the downloaded captions (802) in synchronism with the corresponding sequences of the broadcast program (801). Each time the transmission of the movie is interrupted (806) (e.g., for inserting publicity spots), the user may stop playing captions (802). When the transmission of the movie is resumed (807) (e.g., after publicity spots), the user must submit a re-synchronization command (804) to receive from the Captioning Server (105) fresh synchronization data (808).

The user is also able to adjust the timing window of the captioning stream (611) on the user device (600). For example, the user has the possibility to change an adjustment time by selecting soft keys on a PDA to better adjust displayed captions (611) to the movie's scenes (615).

Universal Timing Systems

Common timing sequences, independent of locations of speakers and auditors, can be derived from an absolute timing reference such as, for example, the Global Positioning System (GPS) time or the Universal Time Co-ordinated (UTC) time (also known today as GMT and ZULU time). To transmit precise timing signals, the GPS uses 24 satellites in 55° inclined orbits 10,000 miles above the earth. These timing signals are used by any GPS receiver anywhere on the earth to determine its position. A 1575 MHz transmission carries a 1-MHz bandwidth phase-modulated signal named the clear acquisition (C/A) code. When a GPS receiver receives this signal from at least three GPS satellites, it can determine its own latitude and longitude with an accuracy of about 30 meters. Apart the determination of geographical positions, the GPS is today widely used for distributing Precise Time and Time Interval (PTTI). The system uses time of arrival (TOA) measurements for determining a position. A precisely timed clock is not essential for the user because time is obtained in addition to position by the measurement of the TOA of four satellites simultaneously in view. If the altitude over sea level is known, three satellites are sufficient. If the user is stationary at a known position then, in principle, the time can be obtained by the observation of a single satellite. Information about the GPS time service is supplied by the "Time Service Department", U.S. Naval Observatory, Washington, D.C., at http://tycho.usno.navy.mil/

GPS Receivers

Direct-to-Digital GPS Receiver is described in the article entitled "Silicon:germanium-based mixed-signal technology for optimization of wired and wireless communications", by B. S. Meyerson, IBM Journal of Research and Development, Volume 44, Number 3, 2000 on the Web site: http://www.research.ibm.com/journal/rd/443/meyerson.html This is an example of a tiny low cost chip which can integrate GPS into anything (e.g., a PDA, a mobile phone, a wearable computer, a video camera). This receiver has been jointly developed between IBM and Leica. The high speed analog capabilities of SiGe technology, when integrated with the CMOS technology, allows the integration of this single chip directly to a digital GPS (Global Positioning System) receiver. GPS derived position information is finding a multitude of diverse applications: from mapping and surveying to vehicle tracking to 911 cell phone caller location to automated farm equipment to even robotics golf carts . . . This receiver chip reduces the radio dimensions and complexity. There are no analog mixer stages, nor costly discrete components (such as high quality filters) that conventional two stage analog down conversion would have required. Instead, the incoming GPS signal is literally digitized right at the antenna, then filtered digitally in a CMOS based chip. This direct digitization is made possible by the ability of SiGe technology to run at high speed on very little power, and the core of this technology is a SiGe based Analog to Digital Data Converter.

According to the present invention GPS or GLONASS receivers must be integrated or connected to the broadcast station and to user devices (e.g., Personal Computers, wearable computers, Personal Digital Assistants (PDAs), smart phones or onboard mobile computers). The universal timing signals that are received from GPS or GLONASS satellites, are used to initialize and synchronize the internal electronic clocking systems on the broadcast station and user devices according to the same universal time. During the periods on which GPS or GLONASS satellites are out of sight (e.g., when user devices are inside buildings or not connected to an external antenna), and no timing signals are thus received from those satellites, timing information must be continuously derived from the autonomous electronic clocking systems. Depending on the drift of the internal clocking systems, and to keep enough timing precision and to be sure that user devices are synchronized with broadcast stations at the same universal time, a more or less frequent periodic reception of satellite signals must be performed. In practice satellite signals will be received when the user is out of doors or is traveling.

Synchronization Data File

Figure 2:
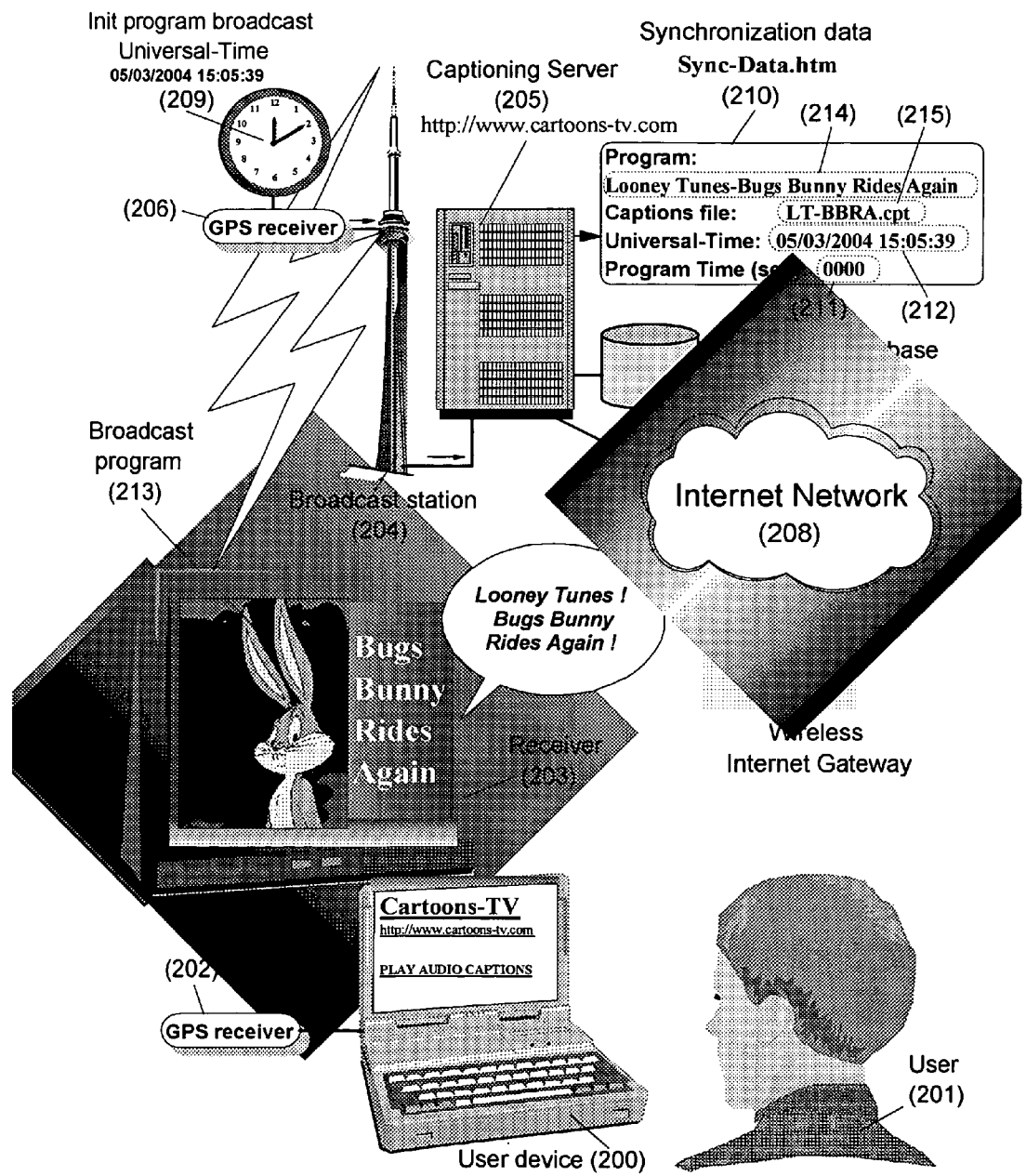
FIG. 2 illustrates how when a broadcast station starts or resumes transmission of a program, synchronization data—including universal-time and program duration—is recorded on a Captioning Server, according to the present invention.

FIG. 2 shows how when the broadcast station (204) starts or resumes (e.g., after an interruption) the transmission of a program (213) (e.g., "Bugs Bunny Rides Again"), a Synchronization Data File (210) (e.g., Sync-Data.htm) associated with the program, is created or updated on the Captioning Server (205). This Synchronization Data File includes data items such as:

the title of the program (214) (e.g., "Looney Tunes—Bugs Bunny Rides Again");

the associated Captions File name (215) (e.g., LT-BBRA.cpt);

the universal-time (209, 212) (e.g., May 3, 2004 15:05:39) at which the broadcast station (204) starts or resumes the transmission. The universal-time is provided by a GPS receiver (206) connected to the broadcast station (204).

the time elapsed from the start of the broadcast program (211) (e.g., 0000 seconds), defined by the previously recorded universal-time corresponding to the start of the program.

In particular, in the example shown in FIG. 2, the universal-time (212) (e.g., May 3, 2004 15:05:39) corresponds to the time at which the broadcast of the program starts. However the broadcast of the program (i.e., 0000 seconds of program duration) has not started.

During the transmission of a program (213), the broadcast station must control and update synchronization data (210) on the Captioning Server (205). In fact, during continuous (i.e., non interrupted) transmission of a program, the broadcast station (204) updates at regular intervals (e.g., every second) the elapsed program time (810) (i.e., the duration of the transmitted program), corresponding to instant universal-times of transmission (811). If the transmission of the program is interrupted (e.g., to insert advertising (806), the access to the synchronization data (210) is disabled to prevent users (210) to download wrong synchronization data on their user devices (200). When the transmission of the program is resumed (807) (e.g., after advertising), the broadcast station (204) resumes the normal process of updating at regular intervals synchronization data on the Captioning Server (205), including the elapsed program time corresponding to instant universal-times of transmission. Also, when the transmission of the program is resumed (807), the access to updated synchronization data (808) is enabled again.

Download of Synchronization Data File and Captions File

Figure 3:
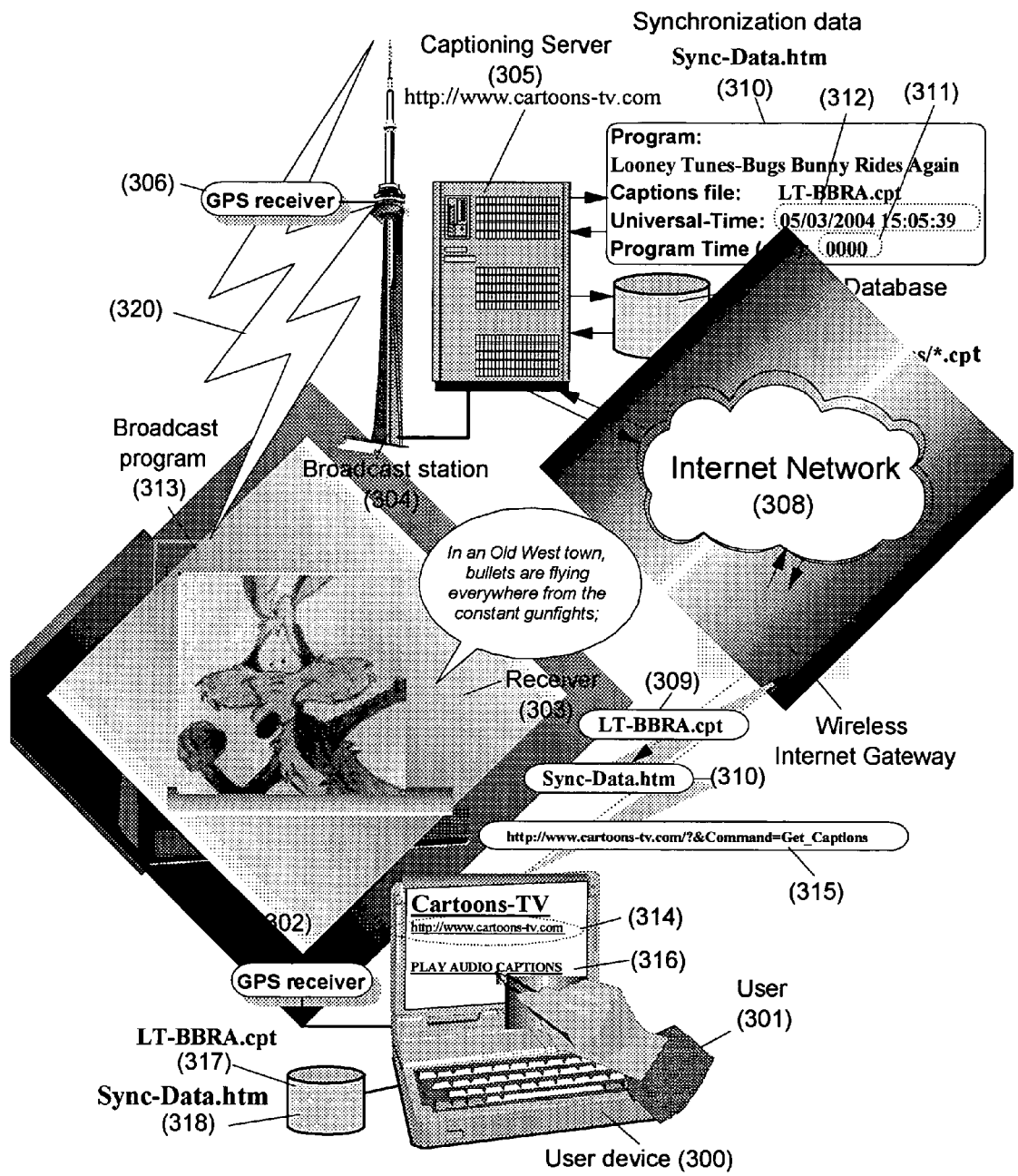
FIG. 3 shows how when the user decides to display captions of a broadcast program, a Captions File and synchronization data are downloaded from a Captioning Server to the user device, according to the present invention.

FIG. 3 illustrates how, when a user wishes to play captions of a broadcast program (313) (e.g., "Bugs Bunny Rides Again"), that is being played on a broadcast receiver (303), the synchronization data file and the captions file must be first downloaded by the user from the Captioning Server (305). This figure shows how the user (301), by means of a utility program running on the user device (300) connects to a communications network (308) (e.g., to the Internet), and submits a request (316) to play audio captions, to the URL (e.g., http://www.cartoons-tv.com) of the Captioning Server (305) associated with the station (304) broadcasting the program that is actually being displayed on the receiver (303) (e.g., a TV set on a cafeteria). When the request to play audio captions (315) (e.g., http://www.cartoons-tv.com/?&Command=Get_Captions) is received by the Captioning Server (305), the Captioning Server accesses and retrieves from a program's Captions Database (307) (e.g., from directory/programs/captions/) the Captions File (400) (e.g., LT-BBRA.cpt) corresponding to the program that is being transmitted by the broadcast station (304). The Captions File (309, 400) and the Synchronization Data File (310) (e.g., Sync-Data.htm) are then downloaded throughout the communications network (308) from the Captioning Server (305) to the user device (300). Once these files are received, the user (300) may choose to disconnect the user device (300) from the communications network (308). Also, once the Captions File (317) and the Synchronization Data File (318) have been received, the user (300) may choose to start to play on the user device (300) the captions of the broadcast program that is being received (313).

Structure of Synchronization Data File and Captions File

Figure 4:
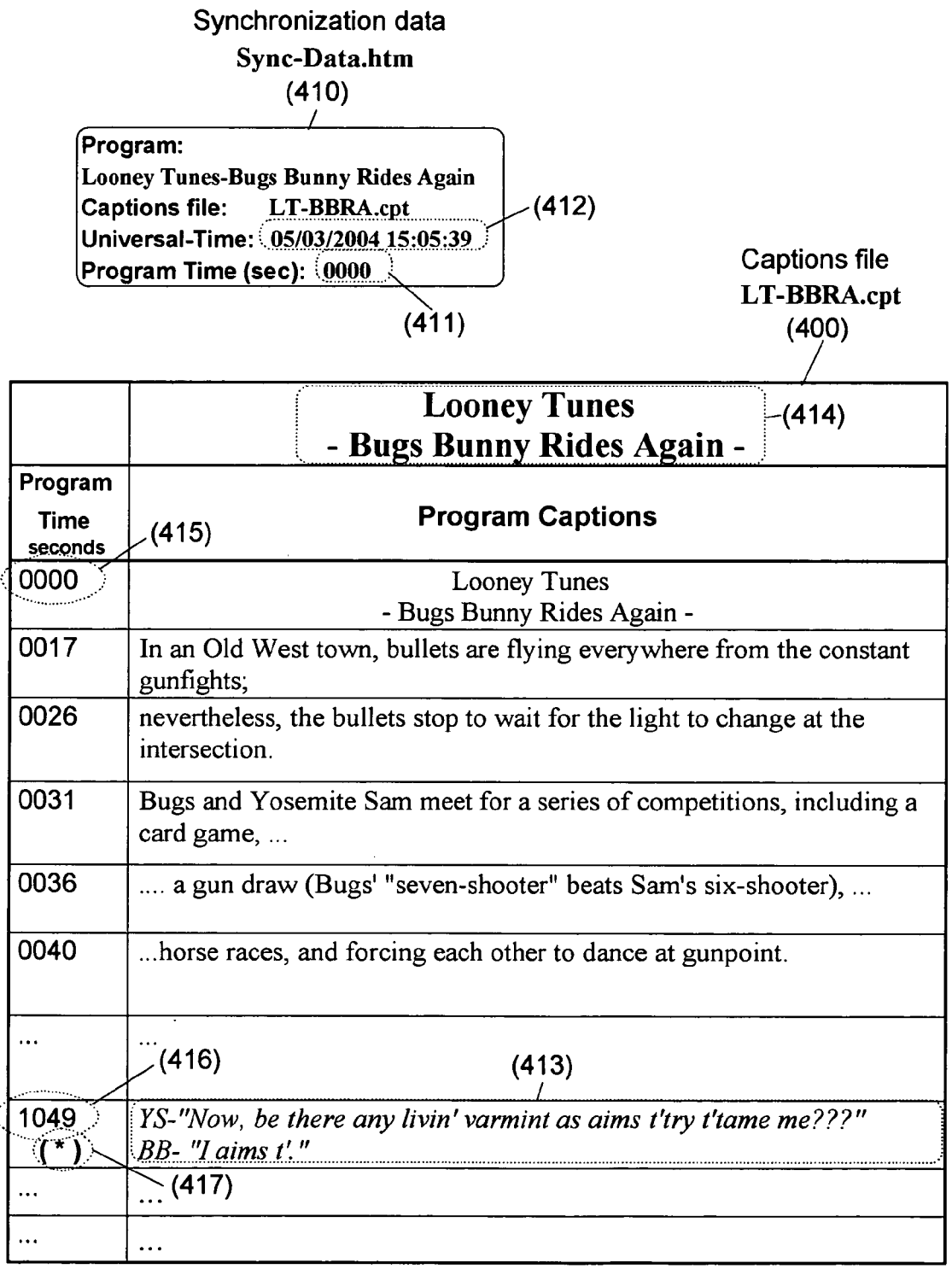
FIG. 4 shows an example of synchronization data and Captions File according to the present invention.

FIG. 4 describes the Synchronization Data File and the Captions File of a selected program, according to the present invention. As described herein before, the Synchronization Data File (310, 410) (e.g., Sync-Data.htm) associated with the broadcast program (313), is created and periodically updated by the Captioning Server (305) associated with said broadcast station. The Synchronization Data File comprises data items like:

the title of the program (e.g., "Looney Tunes—Bugs Bunny Rides Again");

the Captions File name of the program (e.g., LT-BBRA.cpt);

the universal-time (412) (e.g., May 3, 2004 15:05:39) at which the broadcast station (304) starts or resumes the transmission of the program; and the time elapsed from the start of the program (411) (e.g., 0000 seconds), or the duration of the program that has been broadcast at the recorded universal-time (412).

FIG. 4 also shows the structure of a Captions File (400) (e.g., LT-BBRA.cpt) that is stored on a Captioning Server (305), and that can be downloaded on demand (316) by a user (301) to his/her user device (300). As shown in FIG. 4, the Captions File (400) of a program (414) (e.g., "Looney Tunes—Bugs Bunny Rides Again") comprises a table of time stamped captions. For each entry in this table, a program duration (416) (e.g., 1049 seconds) is associated with the text of the caption (413) (e.g., YS—"Now, be there any livin' varmint as aims t' try t' tame me???"—BB—"I aims t'. "). The time duration corresponds to the time at which said caption must be played or displayed to the user. As said before, when captions (413) of a program (414) are edited by the editor or the producer of the program, they are time tagged with reference to the time elapsed (e.g., seconds) (416) from the start of the program (415).

Generation of the Caption Table

Figure 5:
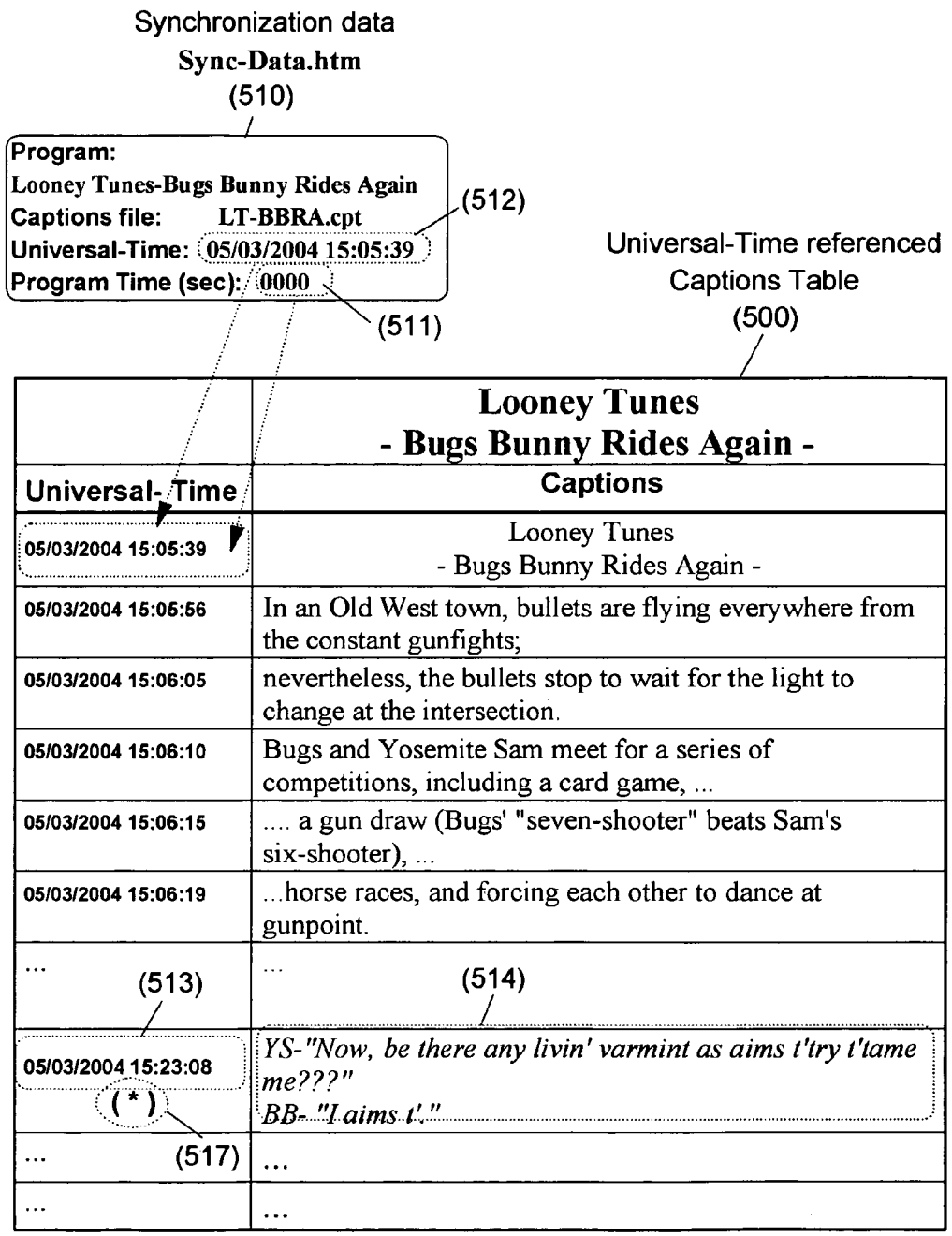
FIG. 5 shows an example of Captions Table, and shows how universal-times corresponding to the display of captions by the user device, are computed from the information contained in the Captions File and the synchronization data, according to the present invention.

FIG. 5 shows how the Captions Table (500) is automatically generated on the user device (300) from:

the Captions File of a program (317, 400) (e.g., LT-BBRA.cpt), and the Synchronization Data File (318, 410) (e.g., Sync-Data.htm), after they have been both downloaded from the Captioning Server (305). Because the user device (300) and the broadcast station (304) are synchronized according to the same universal-time (302, 306), the universal-times (513) corresponding to the textual captions (514) recorded on the program Captions File (400) can be computed by the user device (300).

Basically, the universal-time (512) corresponding to the transmission of an elapsed program time (511) is extracted from the received Synchronization Data File (510). Using both values, the universal time (512) and time elapsed from the star of the program (511) the (program duration referenced) time stamps (416) on the Captions File (400) are converted to universal-time referenced time stamps (513), thus generating a Captions Table (500) comprising universal-times (513) at which corresponding (universal-time stamped) captions (514) must be displayed in synchronism with the reception of the broadcast media stream (615).

Display of Captions

Figure 6:
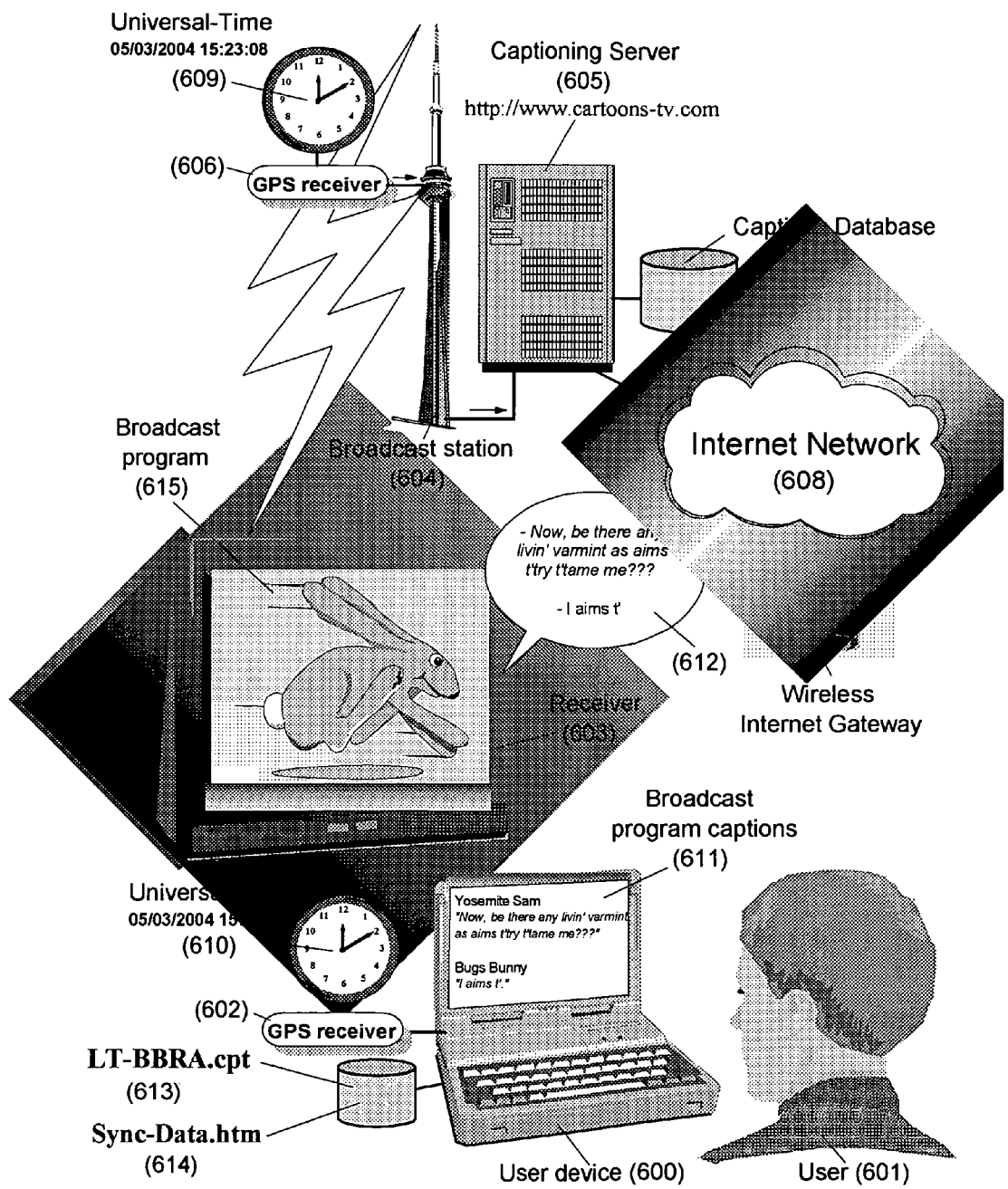
FIG. 6 shows how, even disconnected from the communications network, captions are autonomously displayed by the user device in synchronism with the corresponding frames (scenes) played on the broadcast receiver, according to the present invention.

FIG. 6 shows, when a program (615) is been displayed on a receiver (603), how, by means of the present invention, even when the user device (600) is disconnected from the communications network (608), universal-time stamped captions (514) that must be displayed by the user device (600) at the corresponding scheduled universal-times (513), are read from the Captions Table (500) and are displayed when the universal-time provided by the universal-time receiver (610) (e.g., a GPS receiver) matches with the universal-time (513) of those time stamped captions (514). By means of this method, captions (611) of a broadcast program are automatically displayed on the user device (600) in synchronism with the corresponding scenes (615) displayed on by the receiver (603).

Creation of Captions

Figure 7:
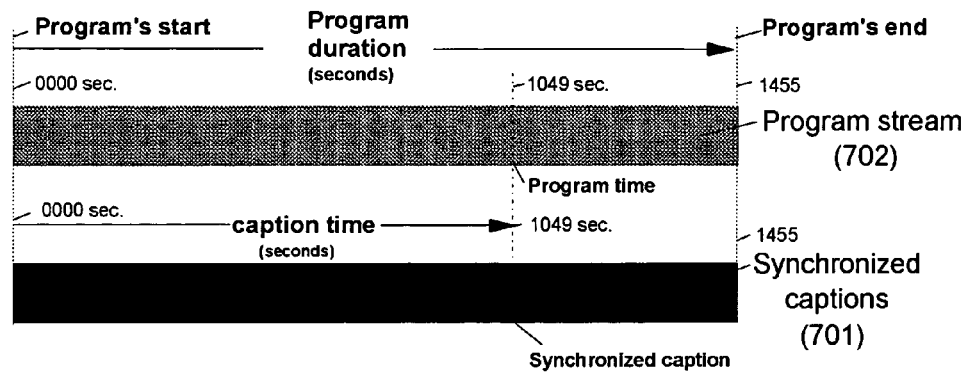
FIG. 7 shows how, according to the present invention, when captions of a program are edited to create a Captions File, captions are time tagged with reference to the time elapsed (seconds) from the start of the program.

FIG. 7 shows how, according to the invention, captions are time tagged with reference to the time elapsed (i.e., seconds) from the start of the program when said captions are edited by the producer or the editor of a program (e.g., of a movie).

Any audio of video program can be captioned. A content provider (i.e. television network) generates off-line, a captioning text stream of a recorded program. Television game shows, videotapes of movies, and corporate videotapes (e.g., training videos) are good examples of offline captioning. Offline captioning is performed after the production of the program, in a studio. The text of the off-line captions is created on a computer. The captions stream (701) and the video (702) are synchronized using time codes. Once the synchronized captions stream has been generated, captions are then transferred and encoded on the videotape before being broadcast or distributed. On television, captions are encoded, or imbedded, into Line 21 of the broadcast signal so that they are visible only when decoded by caption-capable television sets.

Differently from conventional captioning, instead of transferring synchronized captions streams to the video tape or audio tape, the synchronized captions stream (701), produced according to the present invention, is encoded as a separate Captions File (400) and is stored on the Captioning Server (105).

Re-synchronization

Figure 8:
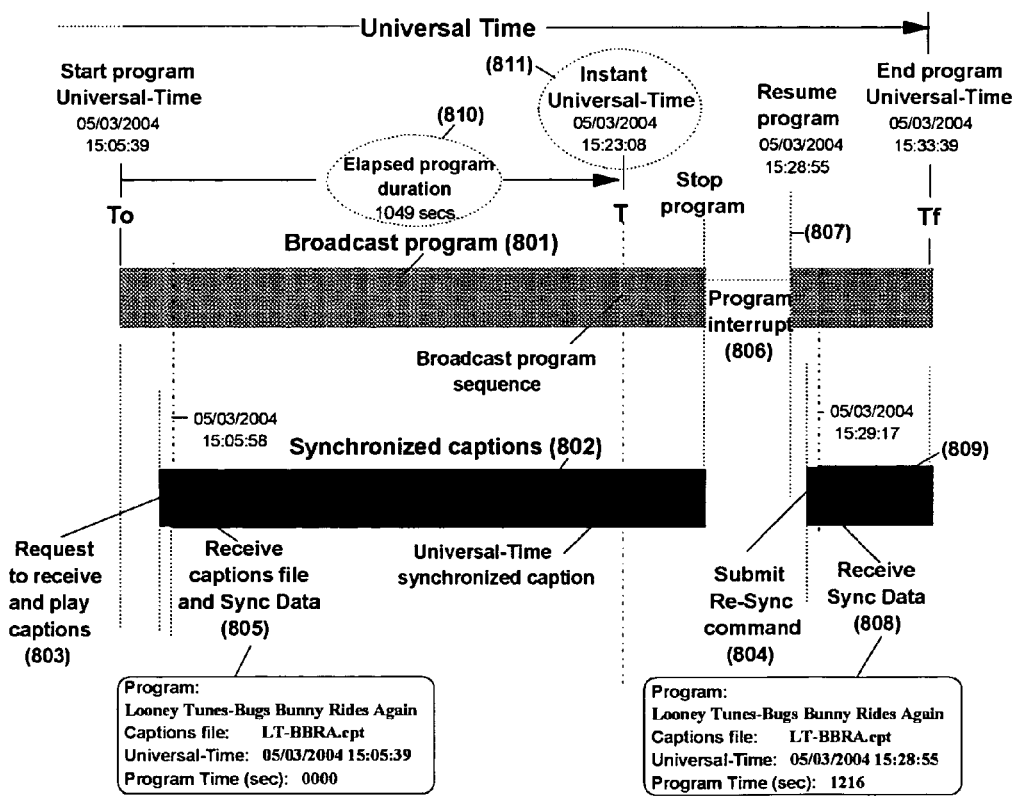
FIG. 8 illustrates the synchronization mechanism of the broadcast program stream and the captions stream according to the universal-time, and how re-synchronization after interruption of the program transmission is achieved.
Figure 9:
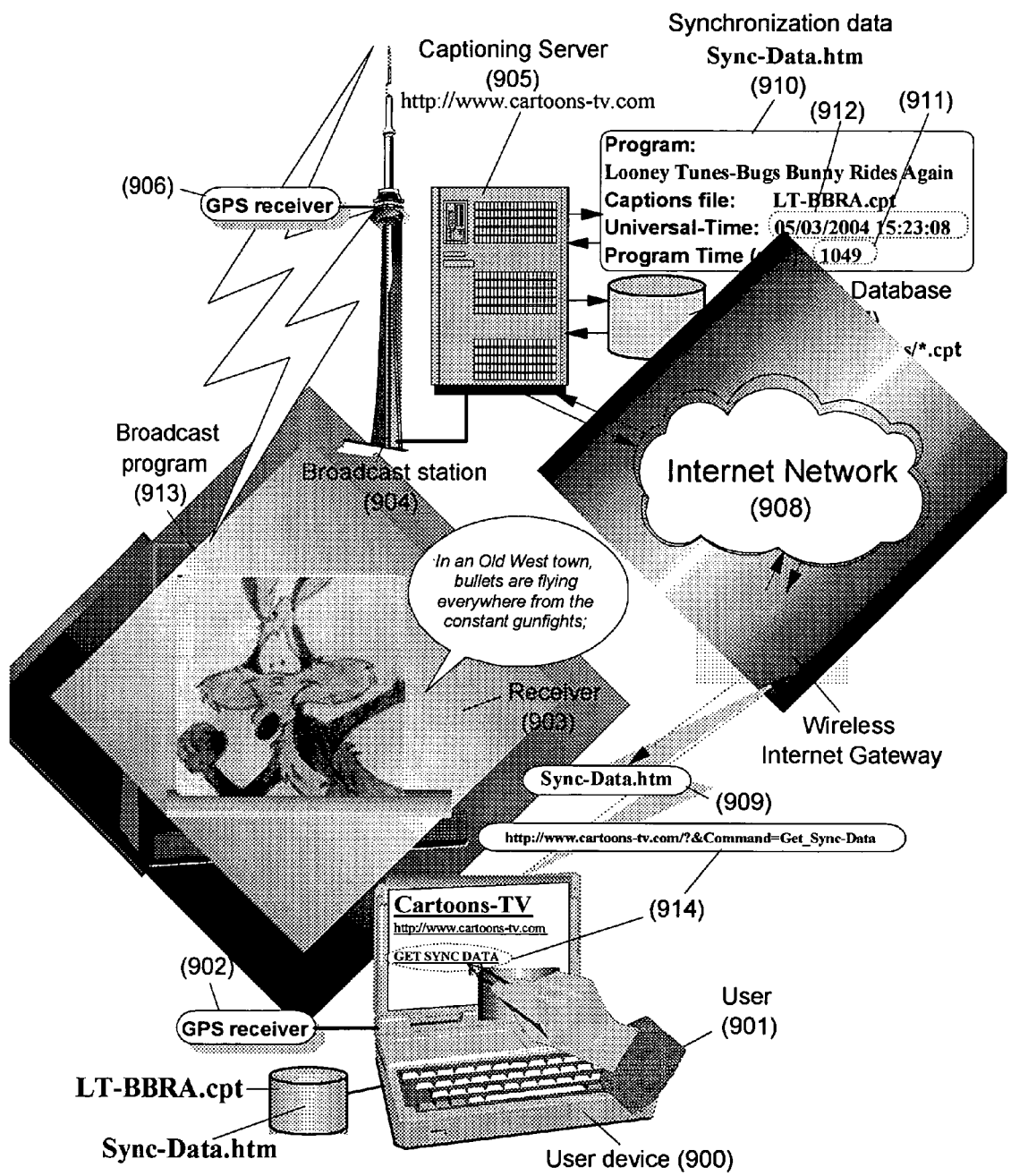
FIG. 9 illustrates how after a program interruption (e.g., advertisements), the user can request fresh synchronization data from the Captioning Server, according to the present invention.

FIGS. 8 and 9 illustrate how the user (901) may request one or more re-synchronizations (914) throughout the duration of the broadcast program (913). For example, a user who enters a cafeteria after a movie (213) (e.g., "Bugs Bunny Rides Again") has started, will do the following steps:

The user connects (803) his/her user device (300) to the network (308) to download the captions file (309, 400) (e.g., LT-BBRA.cpt), and synchronization data (310) (e.g., Sync-Data.htm).

When the captions file (309, 400) and synchronization data (310) are received (805) the movie's captions (611, 802) start playing automatically on the user device (600), and the user may disconnect the user device (600) from the network (608).

Each time the transmission of the movie is interrupted (806) (e.g., by inserted publicity spots), the user may stop playing the captions (611, 802) (e.g., by pressing the user a "STOP CAPTIONS" key, programmed on the user device (600)).

When the transmission of the movie is resumed (e.g., after publicity spots), the user (901) connects his/her user device (900) to the network (908) and submits a re-synchronization command (914, 804) (e.g., "GET SYNC DATA") to receive from the Captioning Server (905) fresh synchronization data (910, 909).

When the synchronization data (310) is received (808) the movie's captions (611, 809) resume playing automatically on the user device (600), and the user may disconnect again the user device (600) from the network (608).

After a program interruption (e.g., advertisements) or at any moment, the user (901) instantly connects his/her user device (900) to the network (908) to request fresh synchronization data (910, 808) (e.g. Sync-Data.htm) from the Captioning Server (905).

FIG. 8 shows time diagrams of the steps of:
requesting (803, 316) the downloading of the captions file (309, 400) and the synchronization data (310, 410) of a broadcast program (213, 313) (e.g., "Bugs Bunny Rides Again") from a Captioning Server (305) to the user device (300);
receiving (805) on the user device, the requested captions file (309) and synchronization data (310) (e.g., universal program time May 3, 2004 15:05:39; elapsed program time: 0000 sec.) from Captioning Server (305); and
starting to display on the user device (600), the captions stream (802, 611) synchronized according to the universal-time with the broadcast program stream (801, 615) transmitted by the broadcast station (604).

FIG. 8 also illustrates the steps of:
resuming (807) the transmission of the broadcast program (801) after a program interruption (806);
requesting (804, 914) the downloading on the user device (900) of new synchronization data (910) from the Captioning Server (905);

receiving (808) on the user device (900), the requested synchronization data:
universal program time May 3, 2004 15:28:55;
duration of the program from its start without taking into account the time of the interruptions: 1216 sec.;
from the Captioning Server (905); and
resuming the display of the re-synchronized captions stream (809) on the user device.

The "duration (211) of the program" corresponds to the time (in seconds) that has been necessary to transmit the content of the program. In the present case 0000 corresponds to the start of the broadcast. This "duration of program" can be obviously different from the time elapsed from the start of the program. In fact if the program is interrupted, the "duration of the program" and the time elapsed from the start of the program have a different value. The "duration of the program" is the time elapsed from the start of the program without taking into account the interruptions.

In a particular embodiment of the invention, a manual procedure to stop, resume and align the captions stream with the broadcast program stream after a program interruption (e.g., by advertisements) comprises the following step:

pressing the user a "STOP CAPTIONS" key on the user device when the program is interrupted (e.g., at advertisements start);

pressing a "PLAY CAPTIONS" key when the program is resumed (e.g., after advertisements);

tuning (putting forward or delaying 1 sec.) the captions stream each time the corresponding key is pressed (e.g., by pressing programmed CAPTIONS ADVANCE (–>) or CAPTIONS DELAY (<–) keys on the user device).

This manual procedure avoids a reconnection of the user device to the network, but requires some attention from the user.

Propagation Delay

Figure 10:
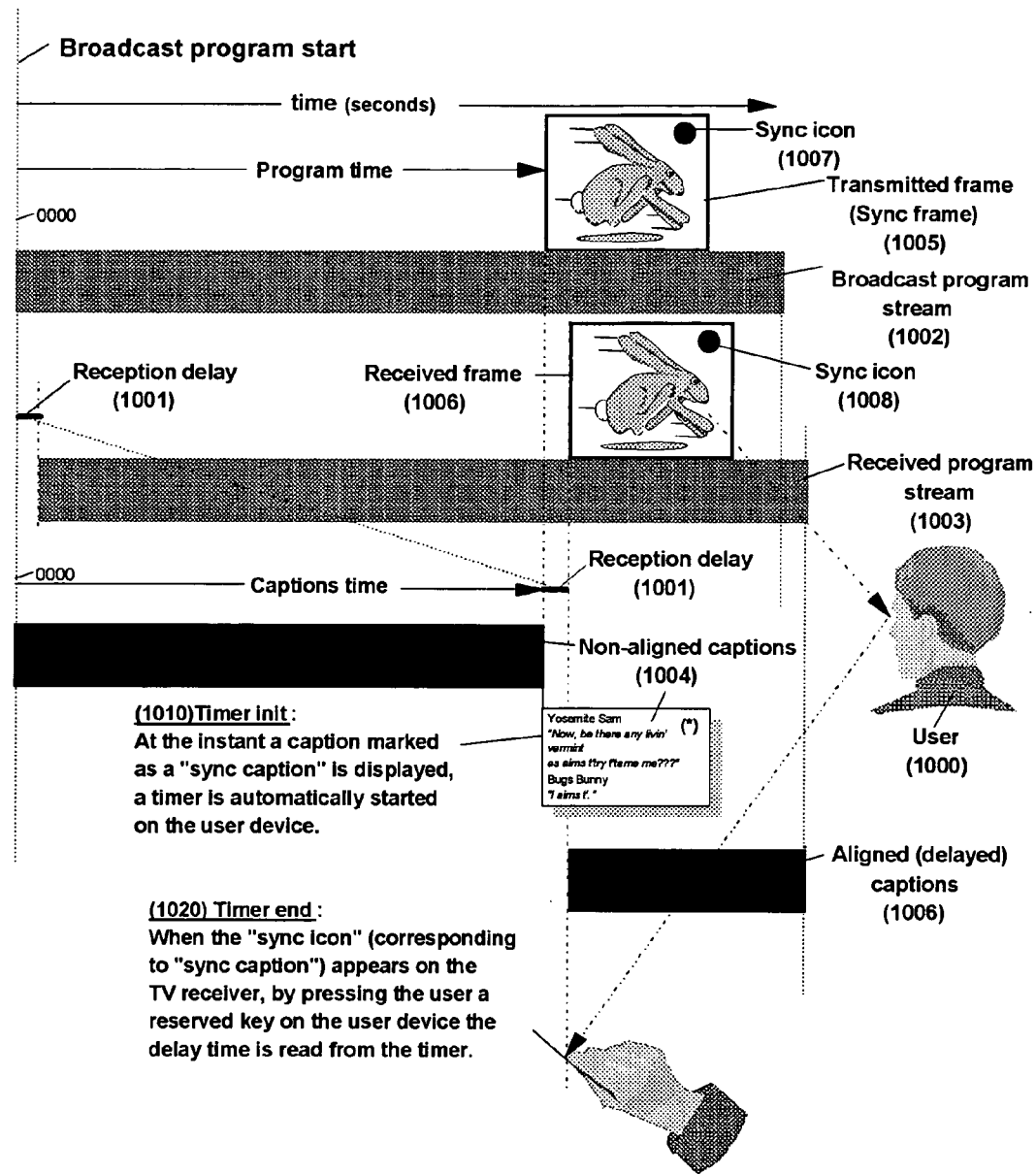
FIG. 10 shows how delays to receive broadcast signals can affect the synchronism of captions displayed on the user device and frames displayed on the receiver; and shows a procedure to compensate for this effect, according to an embodiment of the present invention.

FIG. 10 shows how, due to the time of propagation of the broadcast signals (320) from the broadcast station (604) to the receiver (603), there is always a delay (1001) on the reception that affects the synchronization of the captions (611) that are autonomously played on the user device (600).

The basic synchronization mechanism that has been described herein before and which consists in synchronizing the clocks (609, 610) of the broadcast station (604) and the user device (600), doesn't take into account the transmission delay (1001) introduced by the propagation of the broadcast signal, from the broadcast station (604) to the receiver (603). In practice, this transmission delay is variable, and among other parameters, depends on the distance between the broadcast station (604) and the receiver (603). Under certain circumstances, this delay can reach several seconds.

As can be observed in FIG. 10, since the broadcast station (604) and the user device (600) are synchronized according to the same universal-time (609, 610), the propagation time produces a reception delay (1001) and a miss-alignment of the broadcast media stream (1003) played on the receiver (603) with respect to the broadcast media stream (1002) transmitted by the broadcast station (604). It results a delay between the broadcast media stream (1003) played on the receiver (603) and the captions stream (1004) played by the user device (600).

Since the system and method according to the present invention are based on a precise synchronization of broadcast stations (604) and users devices (600) according to the same universal-time (609, 610), in the absence of a corrective measure, a transmission delay (1001) of the broadcast signal (320) results in that captions (1004) on the captions stream generated by the user device (600) are displayed to the user (601) "in advance", before the corresponding (correct) frames (1006) of the broadcast program that are received and displayed later on.

Correction of the "Advance Effect"

Referring to broadcast television, depending on different possible embodiments of the invention, the "advance effect" of captions (1004) on the captions stream displayed on the user device (600), with respect to frames (1006) on the broadcast program stream (1003) displayed on the TV receiver (603), can be corrected using a single one, or a combination of mechanisms, such as:

Automatic correction: Using the GPS receiver (302) integrated in the user device (300), when the user (301) requests synchronization data (310) from the Captioning Server (305), the user device can transmit the user's location coordinates (i.e., longitude and latitude as determined by the GPS) to the Captioning Server (305). Using geographic data (e.g., the geographic coordinates) of the location of the TV receiver (303) (the same as the user's location), a routine implemented on the Captioning Server (305) connected to the Broadcast Station (304) may compute (or estimate) the delay (1001) of the TV broadcast signal (320) propagated from the Broadcast Station (304) to the TV receiver (303). This computed (or estimated) delay may be transmitted, along with Sinc-Data (310) to the user device (300). The user device may use the value of this delay (1001) to correct (delay) all the captions scheduled universal-times (513) stored on the Captions Table (500). In this way it is possible to generate and aligned (delayed) captions stream (1006) that compensates the advance (1001) on the captions stream displayed by the user device (600) due to the delay (1001) on the reception of the broadcast signal (320).

Figure 11:
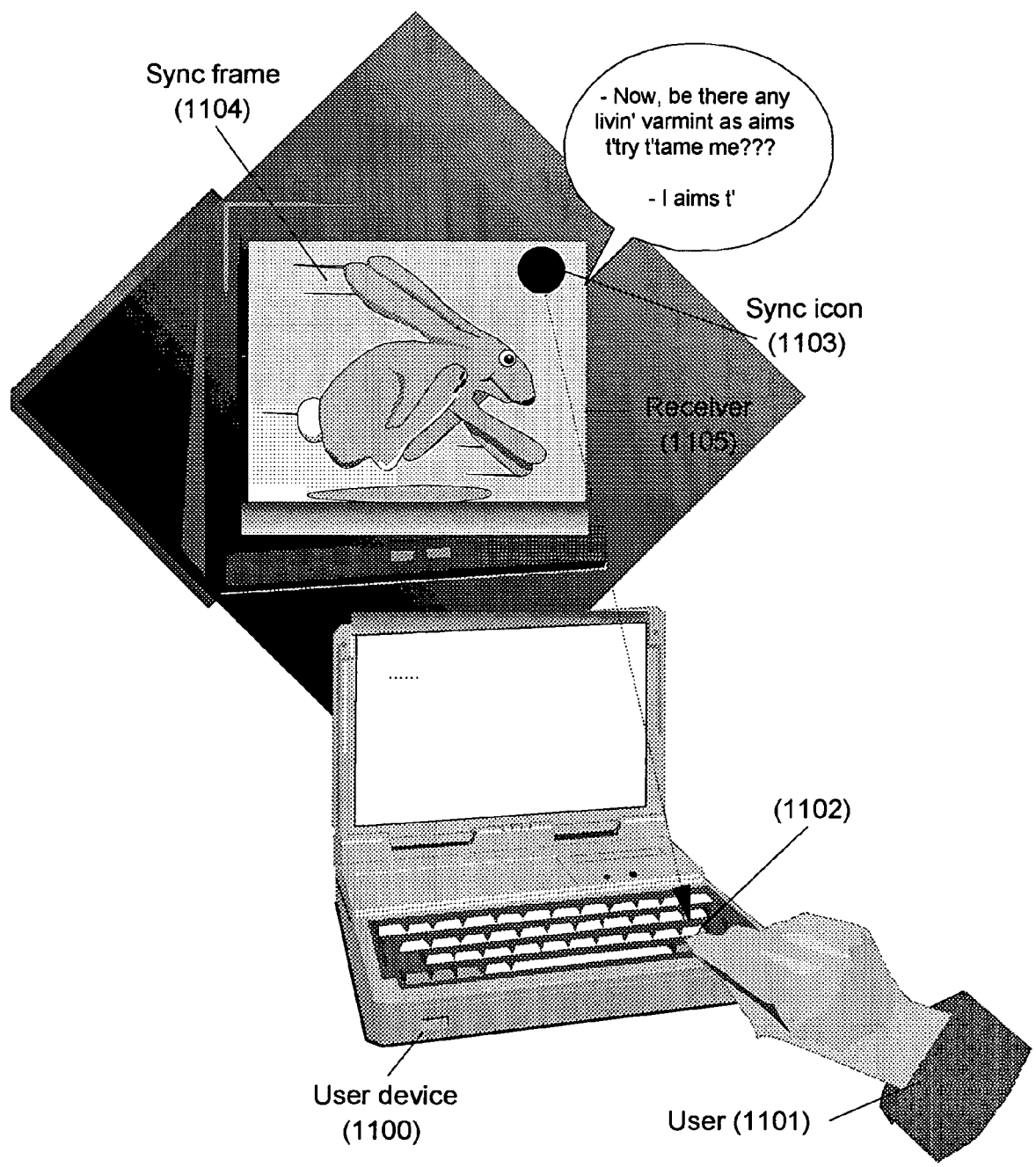
FIG. 11 shows how, to better align captions displayed on the user device with the correct frames of a program, a reserved key is pressed when a "synch icon" is displayed on the receiver, according to an embodiment of the present invention.

Semi-automatic correction: This correction mechanism, illustrated in FIGS. 10 and 11, is based on "synchronization frames" (1005). The video record is marked with "synchronization frames" (1005) by means of a special icon ("synchronization icon") (1007) that will be visually perceptible (1008) by the user (1000) when those frames (1006), transmitted by the broadcast station (604), are received and displayed on the receiver (603). In the Captions File (400), the captions (413) corresponding to "sync frames" (1005) are tagged as "synchronization captions", by means of a special symbol (417) (e.g., (*)). The correction mechanism requires a timer (i.e., a hardware or even a software timer) running on the user device (600), and basically comprises:

Timer init (1010): While playing a captions stream by the user device (600), at the time (513) a caption (514) tagged as a "sync caption" (517) on the Captions Table is displayed, the timer is automatically started.

Timer end (1020): When a "sync icon" (1008, 1103) (e.g., a red circle) marking the frame as a "sync frame" (1104), is shown on the TV receiver (1105), the user presses (1101) a reserved key (1102) on his/her user device (1100) to stop the timer. The measured reception delay time (1001) is read from the timer.

Correction: Universal-times on the active Captions Table (500) are delayed according to the measured timer value (1001).

Manual correction: This correction is based on means for enabling the user to incrementally and manually adjust the timing window of the captioning stream (611) on his/her user device (600), based on the perceived delay of the captions stream played by the user device with respect to the broadcast program stream. For example, the user may change an adjustment time by selecting soft keys to betted adjust displayed captions (611) to the movie's (615) scenes.

Method for Downloading and Playing Captions

Figure 12:
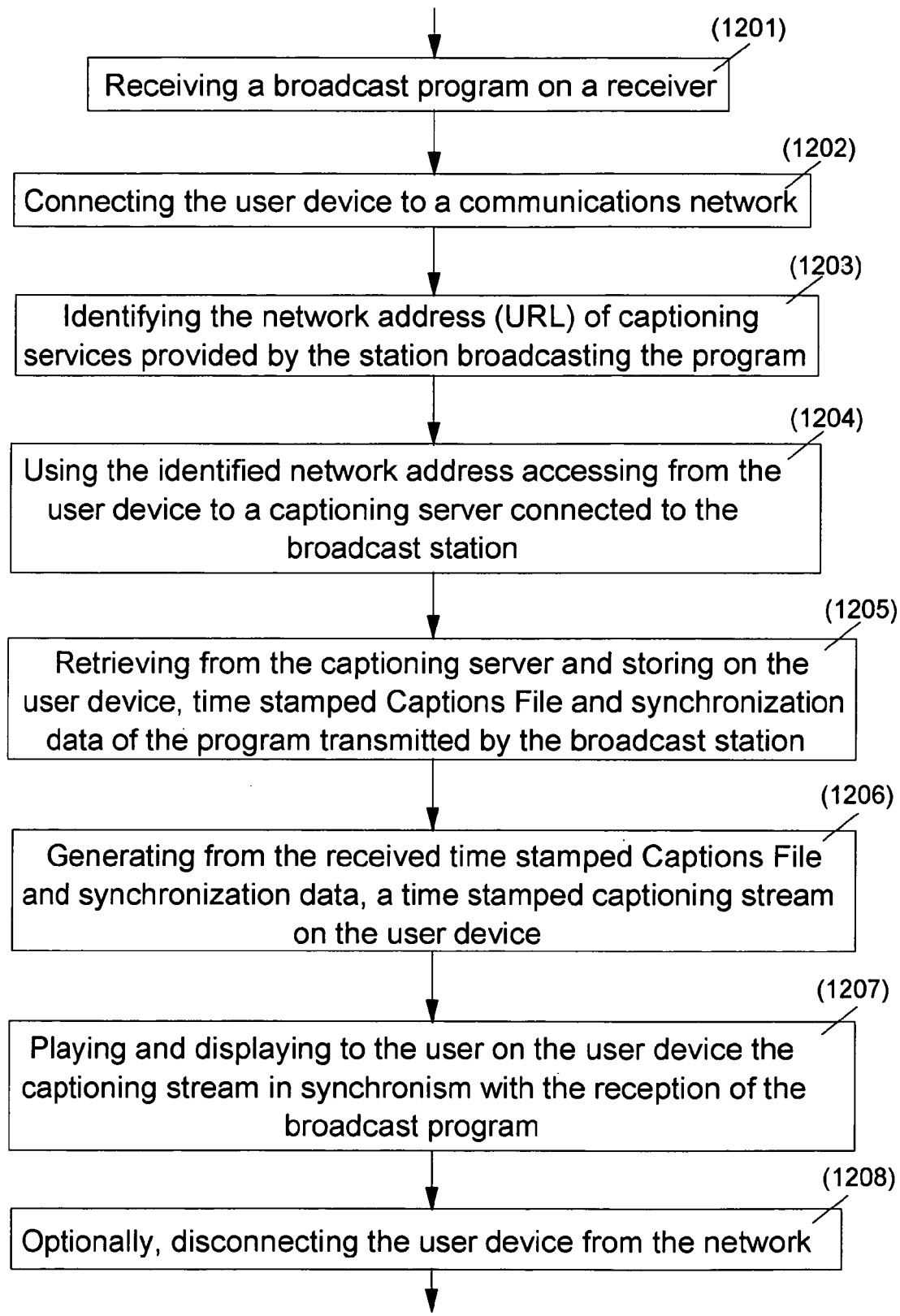
FIG. 12 shows the steps of the method for enabling a radio auditor or a television viewer to download from a network and then to play on a stand-alone (i.e., not connected to a network) user device a captioning stream synchronized with a received broadcast program stream, according to the present invention.

FIG. 12 shows the steps of the method for enabling a radio auditor or a television viewer (101) attending a broadcast program (113) (i.e., a radio broadcast or a television program received in real-time), to download from a network and then to play on a stand-alone (i.e., not connected to a network) user device (100), a captioning stream (111) synchronized with the received broadcast program stream (113); the method, for implementing on a computer program on the user device (100), comprising the steps of:

1201—receiving a broadcast program (113) on a receiver (103);

1202—connecting the user device (300) to a communications network (308);

1203—identifying the network address (URL) (314) of captioning services provided by the station (304) broadcasting the program;

1204—using the identified network address (314) accessing from the user device (300) to the captioning server (305) connected to the broadcast station (304);

1205—retrieving from the captioning server (305) and storing on the user device (300), time stamped Captions File (309), (317) and synchronization data (310), (318) of the program (313) transmitted by the broadcast station (304);

1206—generating from the received time stamped Captions File (317) and synchronization data (318), a time stamped captioning stream (500) on the user device;

1207—playing and displaying to the user (601) on the user device (600) the captioning stream (611) in synchronism (610), (609) with the reception of the broadcast program (615);

1208—optionally, disconnecting the user device (608) from the network (608).

Method for Re-synchronizing Captions After Program Interruptions

Figure 13:
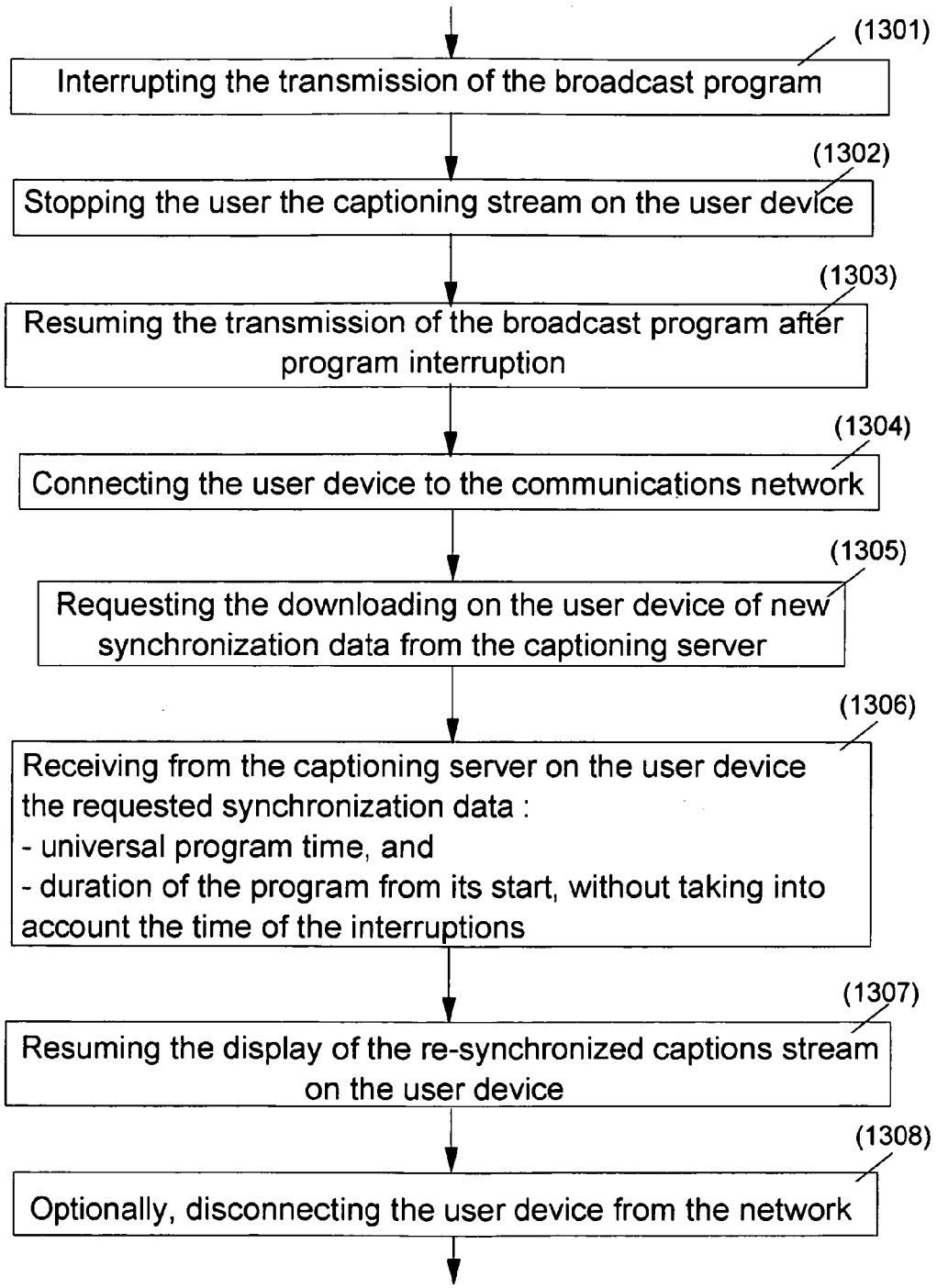
FIG. 13 shows the steps of the method re-synchronization of the caption stream after a program interruption, according to the present invention.

FIG. 13 shows the steps of the method for re-synchronization of the caption stream after a program interruption; the method, for implementing on a computer program on the user device (100), comprising the steps of:

1301—interrupting (806) the transmission of the broadcast program (615);

1302—stopping the user the captioning stream on the user device (600);

1303—resuming the transmission (807) of the broadcast program (913) after program interruption;

1304—connecting the user device (900) to the communications network (908);

1305—requesting (804), (914) the downloading on the user device (900) of new synchronization data (910) from the captioning server (905);

1306—receiving (808) from the captioning server (905) on the user device (900) the requested synchronization data:
  universal program time (912), and
  duration of the program from its start (911), without taking into account the time of the interruptions;

1307—resuming the display of the re-synchronized captions stream (809) on the user device (900);

1308—optionally, disconnecting the user device (600) from the network (608).

While the invention has been particularly shown and described with reference to a preferred embodiment, it will be understood that various changes in form and detail may be made therein without departing from the spirit, and scope of the invention.

What is claimed is:

1. A method for use on a personal mobile computer device for autonomously displaying to a user of said personal mobile computer device a time-stamped captioning stream synchronized with a broadcast program received and displayed on a separate program receiver, said method comprising the steps of:
   connecting to a communications network;
   identifying a broadcast program displayed on a program receiver in a public location, wherein the broadcast program and the program receiver are separate from the personal mobile computer device;
   retrieving from a captioning server time-stamped captioning data and synchronization data associated with the broadcast program displayed on the separate program receiver;
   disconnecting from the communications network after the data is retrieved;
   automatically converting the time-stamped captioning data and synchronization data to a time-stamped captioning stream synchronized with the broadcast program on the separate program receiver; and
   displaying on the personal mobile computer device to said user said time-stamped captioning stream in synchronism with the display of the broadcast program on the separate program receiver.

2. The method according to claim 1 wherein the step of automatically converting the time-stamped captioning data and synchronization data into a time stamped captioning stream synchronized with the display on the program receiver of the broadcast program, comprises the further step of:
   synchronizing based on a universal-time, the display of time stamped captioning stream on the personal mobile computer device with the display on the program receiver of the broadcast program.

3. The method according to claim 1 wherein said synchronization data comprises:
   the universal-time; and
   the duration of the program until said universal-time without taking into account interruptions.

4. The method according to claim 1 wherein each time stamped caption comprises a reference to the time elapsed from the start of the program.

5. The method according to claim 1 wherein the step of automatically converting the time-stamped captioning data and synchronization data into a time-stamped captioning stream synchronized with the display on the program receiver of the broadcast program, comprises the further step of:
   for each time-stamped caption: converting the reference to the time elapsed from the start of the program to a reference to the universal-time at which the corresponding caption must be displayed in synchronism with the display of the broadcast program.

6. The method according to claim 1 wherein the step of displaying on the personal mobile computer device to said user said time-stamped captioning stream in synchronism with the display of the broadcast program on the separate program receiver in the public location, comprises the further step of:
   displaying on the personal mobile computer device to said user each caption according to the associated reference to the universal-time.

7. The method according to claim 1 wherein the step of retrieving from a captioning server time-stamped captioning data and synchronization data corresponding to a broadcast program, comprises the further steps of:
   identifying a network address of the captioning server connected to said communication network;
   having access to the captioning server using the identified network address;
   retrieving on the accessed captioning server and storing on the personal mobile computer device, a time stamped captions, and synchronization data corresponding to a broadcast.

8. The method according to claim 1 comprising interruption of the broadcast program, and thereafter the further steps of:
   connecting again to the communication network;
   retrieving on the accessed captioning server connected to the communication network and storing on the personal mobile computer device, updated synchronization data, wherein said updated synchronization data comprises: the universal-time after the interruption of the broadcast program; the duration of the program without from the start of the program until said universal-time without taking into account interruptions; and
   disconnecting from the communication network.

9. The method according to claim 1 wherein the step of retrieving from a captioning server time-stamped captioning data and synchronization data corresponding to a broadcast program can be performed at any time prior to or simultaneously with the broadcast of the program on a program receiver in a public location.

10. The method according to claim 1 wherein the step of synchronizing the display of the captioning stream on the personal mobile computer device with the display on the program receiver of the broadcast program, comprises the further step of:
    determining the universal-time by means of a Global Positioning System receiver.

11. The method according to claim 1 comprising the further step of synchronizing the display of the captioning stream on the personal mobile computer device with the display on the program receiver of the broadcast program, and comprising the further step of:
    compensating the propagation delay of the broadcast program.

12. A personal mobile computer device comprising:
    a computer program stored on a non-transitory computer readable storage medium, the program comprising instructions for displaying a time stamped captioning stream synchronized with a broadcast program received and displayed on a program receiver, said computer instructions comprising:
    means for connecting to a communications network;
    means for identifying a broadcast program, wherein said broadcast program is displayed on a program receiver in a public location, wherein the broadcast program and the program receiver are separate from the personal mobile computer device;
    means for retrieving from a captioning server time-stamped captioning data and synchronization data associated with the broadcast program displayed on the separate program receiver;
    means for disconnecting from the communications network after the data is retrieved;
    means for automatically converting the time-stamped captioning data and synchronization data to a time-stamped captioning stream synchronized with the broadcast of the program; and
    means for displaying on the personal mobile computer device to said user said time-stamped captioning stream in synchronism with the display of the broadcast program on the separate program receiver.

13. A computer program stored on a non-transitory computer readable storage medium and comprising instructions for displaying a time stamped captioning stream synchronized with a broadcast program received and displayed on a program receiver, said computer program comprising:

means for connecting to a communications network;
means for identifying a broadcast program, wherein said broadcast program is displayed on a program receiver in a public location, wherein the broadcast program and the program receiver are separate from the personal mobile computer device;
means for retrieving from a captioning server time-stamped captioning data and synchronization data associated with the broadcast program displayed on the separate program receiver;
means for disconnecting from the communications network after the data is retrieved;
means for automatically converting the time-stamped captioning data and synchronization data to a time-stamped captioning stream synchronized with the broadcast program; and
means for displaying on the personal mobile computer device to said user said time-stamped captioning stream in synchronism with the display of the broadcast program on the separate program receiver.

14. A method for use in a server for providing on demand captioning services requested by a user of a personal mobile computer device watching a broadcast program on a program receiver in a public location, said method comprising the steps of:

associating with a broadcast program which is or will be displayed on a program receiver in a public location, time-stamped captioning data and synchronization data, wherein the broadcast program and the program receiver are separate from the personal mobile computer device;
storing said time-stamped captioning data and synchronization data such that it is accessible by said personal mobile computer device;
receiving from said personal mobile computer device a request for captions identifying a broadcast program displayed on a separate program receiver in a public location; and
sending to said personal mobile computer device in response to each request, the time-stamped captioning data and synchronization data so that said personal mobile computer device can automatically convert the captioning data and synchronization data into a time-stamped captioning stream synchronized with the display of the broadcast of the program on the separate program receiver;
disconnecting communication with said personal mobile computer device after the captioning data and synchronization data are sent.

15. The method according to claim 14 wherein said step of associating with a broadcast program which is or will be displayed on a program receiver in a public location synchronization data, comprises the step of associating with the broadcast program:
the universal-time; and
the duration of the program from the start of the program until said universal-time without taking into account interruptions.

16. The method according to claim 14 wherein the step of associating with a broadcast program which is or will be displayed on a program receiver in a public location time-stamped captioning data, comprises the step of associating to each caption, a reference to the time elapsed from the start of the program.

17. The method according to claim 14 wherein the step of associating with a broadcast program which is or will be displayed on a program receiver in a public location synchronization data, comprises the further steps of:
determining the universal-time by means of a Global Positioning System receiver.

18. The method according to claim 14 comprising when an interruption of the broadcast program occurs, the further step of associating with the broadcast program updated synchronization data, said updated synchronization data comprising:
the universal-time after the interruption of the program; and
the duration of the program from the start of the program until said universal-time without taking into account interruptions storing said updated synchronization data so that said updated synchronization data are accessible by said personal mobile computer device.

* * * * *